United States Patent [19]

Feintuch et al.

[11] Patent Number: 4,933,914
[45] Date of Patent: Jun. 12, 1990

[54] CHANNEL ADAPTIVE ACTIVE SONAR

[75] Inventors: Paul L. Feintuch, Covina; Francis A. Reed, Yorba Linda, both of Calif.

[73] Assignee: Hughes Aircraft Company, Los Angeles, Calif.

[21] Appl. No.: 3,529

[22] Filed: Jan. 15, 1987

[51] Int. Cl.$^5$ .............................................. G01S 9/66
[52] U.S. Cl. ...................................... 367/87; 367/901
[58] Field of Search .................... 367/901, 13, 12, 87, 367/137

[56] References Cited

U.S. PATENT DOCUMENTS

| | | | |
|---|---|---|---|
| 2,629,084 | 2/1953 | Eckart et al. | 367/13 |
| 3,896,411 | 7/1975 | Mackey et al. | 367/13 |
| 4,014,018 | 3/1977 | Williams et al. | 367/13 |
| 4,047,172 | 9/1977 | Baur et al. | 367/13 |
| 4,146,871 | 3/1979 | Ruehle | 367/13 |
| 4,187,488 | 2/1980 | Anderson et al. | 367/13 |
| 4,204,280 | 5/1980 | Slaton | 367/901 X |

OTHER PUBLICATIONS

"Digital Signal for Sonar"; W. R. Knight et al.; Proc. of IEEE, vol. 69, No. 11, Nov., 81, pp. 1451-1506.
"Characterizing the Radar Ambiguity Function"; L. Auslander et al.; IEEE Trans. on Info. Theory, vol. IT-30, No. 6, Nov. 1986, pp. 832-836.
"On Sonar Signal Analysis"; T. Glisson et al.; IEEE Trans. on Aerospace & E Systems, vol. AES-6, No. 1, Jan. 1970; pp. 37-49.
"A Study of a Class of Detection Waveforms ..."; J. P. Costas et al.; Proc. IEEE; vol. 72, No. 9, Sep. 1984, pp. 1143-1163.
"Construction and Properties of Costas Arrays"; Proc. IEEE; vol. 72, No. 9, Sep. 1984; pp. 1143-1163.
"Some Techniques for the Instantaneous ..."; P. A. Bello; IEEE Trans. on Communications Technology; vol. 13, No. 3; 1965, pp. 285-292.
"Scattering Function Estimation"; N. T. Gaardner; IEEE Trans. on IT, vol. IT-14, No. 5; Sep. 1968.
"Direct Search Solution of Numerical ..."; R. Hooke et al.; Journal of ACM, vol. 8, No. 2, 1961, pp. 212-229.

Primary Examiner—Thomas H. Tarcza
Assistant Examiner—Tod Swann
Attorney, Agent, or Firm—Wanda K. Denson-Low

[57] ABSTRACT

A channel adaptive active sonar is disclosed, wherein the sonar transmit waveform is adaptively selected in accordance with the measured sonar channel scattering function to reduce the response of the sonar to unwanted reverberation while preserving the response to signal returns. As a result, the sonar target detectability is improved over sonar systems which do not adapt to the variable properties of the ocean channel. The sonar is operable in two modes, the channel measurement mode and the normal active mode. In the channel measurement mode, probe signals are transmitted to test the channel response. From the sonar receive signals resulting from the transmitted probe signals, the channel scattering function is estimated. The transmit waveform for the sonar active mode is then designed to provide a waveform whose ambiguity function overlaps minimally with the estimated channel scattering function. As a result of the waveform selection, the sonar resonse to reverberation is reduced while maintaining the sonar target response.

23 Claims, 9 Drawing Sheets

FIG. 5
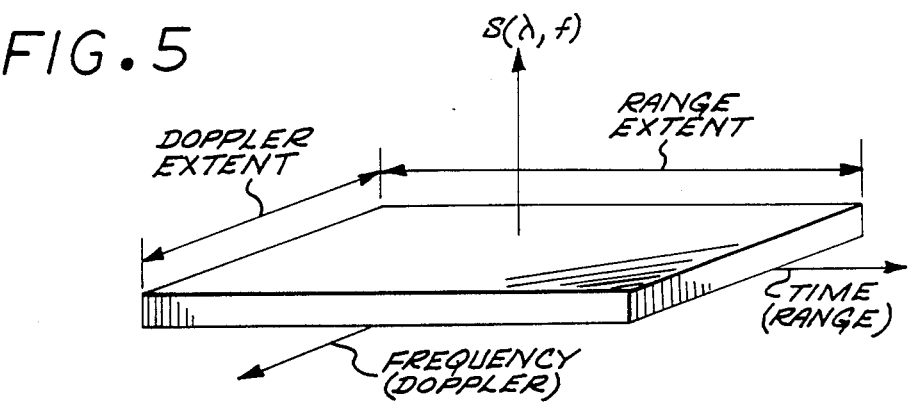
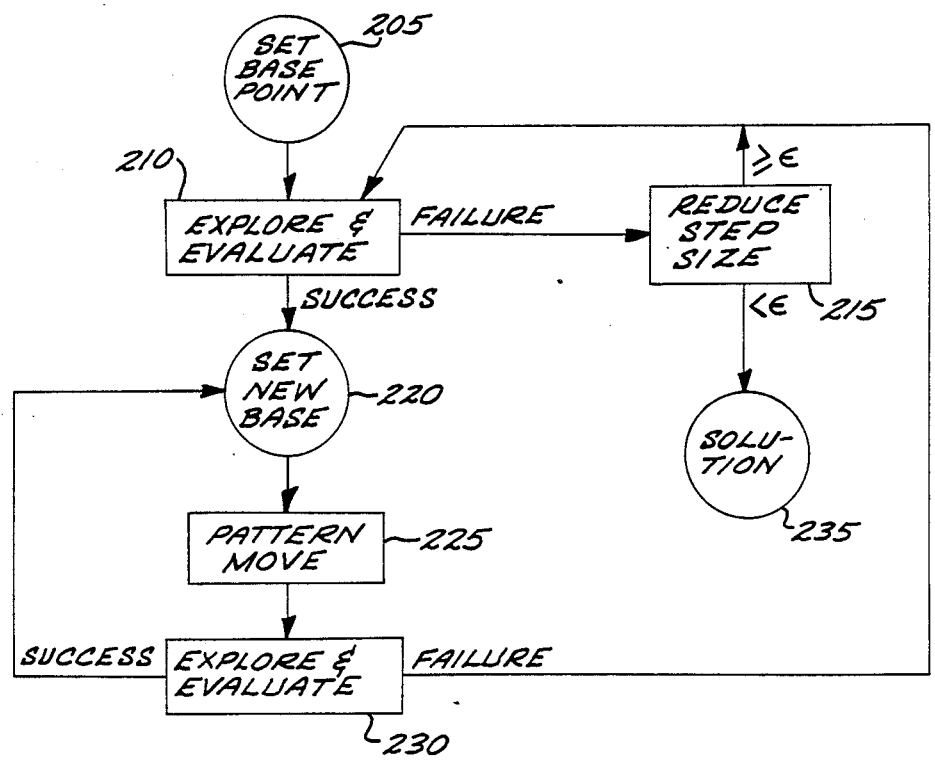
FIG. 12

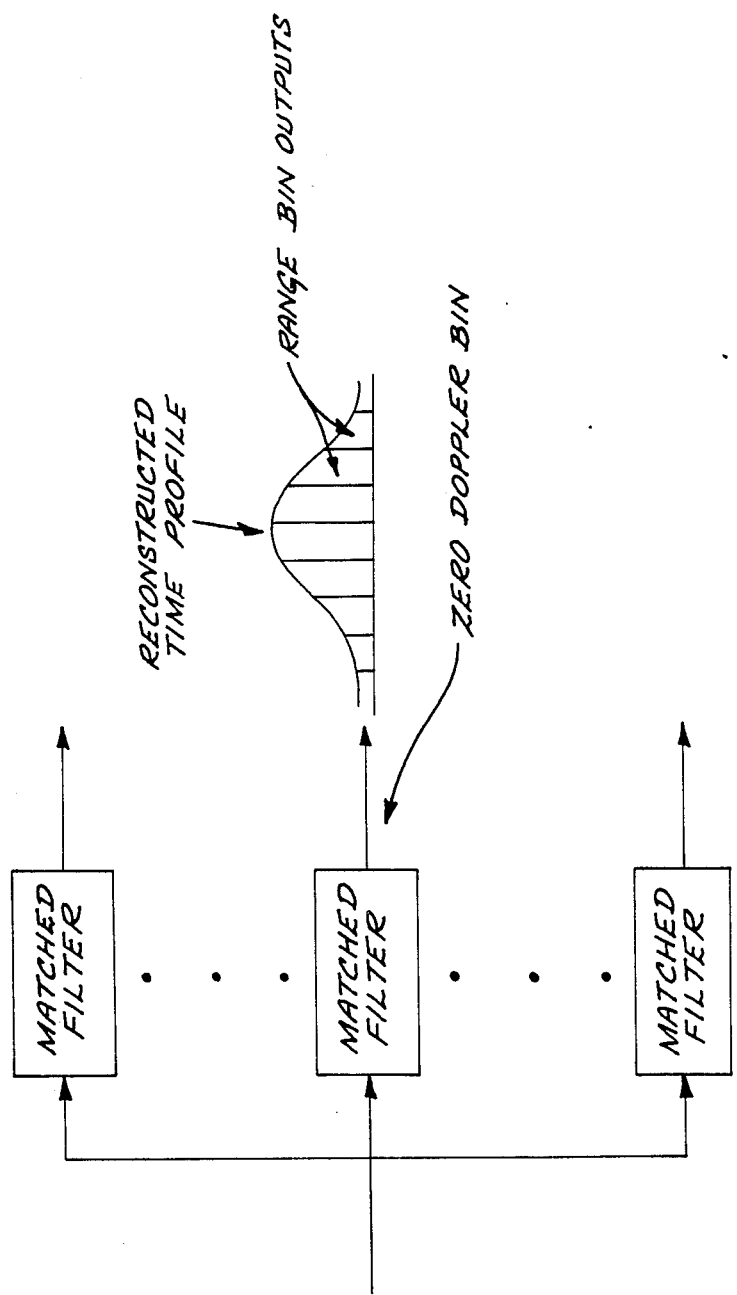

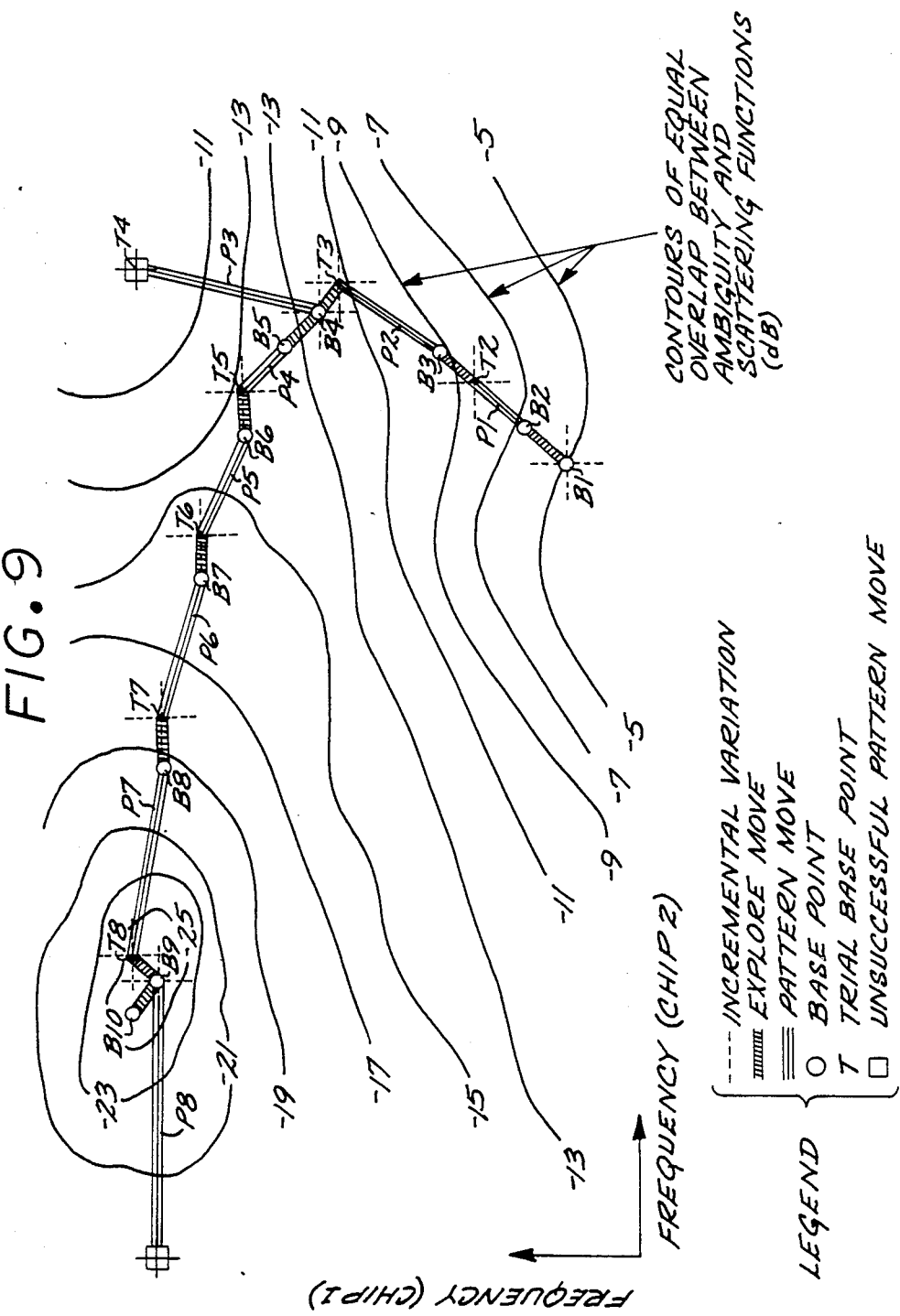

CHANNEL ADAPTIVE ACTIVE SONAR

BACKGROUND OF THE INVENTION

The invention relates to the optimization of active system properties based on observed data, and in particular to an active sonar system which selects the optimum waveform for transmission based on the observed scattering properties of the ocean.

Reverberation is often the limiting noise in the performance of active sonars. It results from the reflection of the transmitted sonar waveform from the multitude of boundaries, inhomogeneities, and particles in the ocean medium, collectively referred to as scatterers. Volume reverberation is the result of scatterers distributed in the volume, or body, of the ocean such as marine life and particles. Surface reverberation is produced by scatterers on the sea surface, such as the non-uniformities produced by wave motion. The scatterers spread the transmitted waveform in both frequency (Doppler) and time (range). The spreading of the transmitted energy in time is primarily due to multipath propagation to and from the scatterers. One cause of frequency spreading is the motion of the scatterers relative to the sonar. In many cases, the frequency spreading is due largely to the fact that scattered energy reaching the receiver from different arrival angles have different Doppler shifts resulting from the sonar platform motion. This induces a spread in frequency related to the angular spread of the reverberation returns.

The amount which the environment spreads the transmitted waveform in time and frequency is expressed in terms of the reverberation scattering function, $(S(\omega,\tau))$, as described, for example, in *Detection, Estimation, and Modulation Theory*, by H. L. Van Trees, Part III, J. Wiley and Sons, 1971, and "Digital Signal Processing for Sonar," W. R. Knight, R. G. Pridham and Steven M. Kay, Proceedings of the IEEE, Vol. 69, No. 11, November, 1981, pages 1451-1506.

When reverberation is the dominant source of noise, the detectability of low Doppler targets is greatly reduced. Most active sonar systems utilize a matched filter receiver to detect signals. The matched filter receiver is designed for use with spectrally white stationary noise, but is often used in situations where the noise is non-stationary because of its simplicity. Waveform design is used to improve the performance of the matched filter receiver in reverberation (which is spectrally non-stationary and non-white). A common type of waveform used in active sonars for reverberation-limited environments is the frequency hopped waveform, which consists of a sequence of contiguous single frequency subpulses or "chips" in which the subpulse frequency varies from subpulse to subpulse.

The objective of waveform design is to adjust the distribution of the transmitted signal energy in time and frequency to reduce the reverberation power at the receiver output. This is done based upon a characteristic of waveforms known as the ambiguity function $A(\omega,\tau)$, which plots the power at the output of the matched filter for a point target as a function of range, $\tau$, an Doppler, $\omega$, relative to the range-Doppler values to which the filter is matched, as described, for example, in the reference. "Characterizing the Radar Ambiguity Function," Auslander, L. and Tolimieri, R., IEEE Transaction on Information Theory, Vol. IT-30, No. 6, Nov. 1986, pages 832-836. The goal of the design procedure is to select waveforms with minimal response to the reverberation, while still preserving the response to the low Doppler signal return. This corresponds to producing a waveform whose ambiguity function has minimal overlap with the reverberation scattering function. See, for example, the reference "On Sonar Signal Analysis," Glisson, T. H.; Black, C. I.; Sage, A. P.; IEEE Transactions on Aerospace and Electronic Systems, Vol. AES-6, No. 1, Jan. 1970, pages 37-49.

For example, if the scattering function consists of a narrow strip along the time axis of the range-Doppler surface, it is desirable to concentrate the sidelobes of the ambiguity function outside this narrow strip. The design of the frequency-hop codes is usually either an exhaustive computer search or a restrictive finite algebra procedure, wherein the transmitted waveforms are designed in advance for an assumed situation. See, for example, the references "A Study of a Class of Detection Waveforms Having Nearly Ideal Range-Doppler Ambiguity Properties," Costas, J. P., *Proc. IEEE*, Vol. 72, No. 8, August 1984, pages 996-1009; "Construction and Properties of Costas Arrays," *Proc. IEEE*, Vol 72, No. 9, September 1984, pages 1143-1163. However, insofar as is known to applicants, there is heretofore no systematic method for constructing a suitable waveform based on any arbitrary scattering function for the channel.

In the past, the primary application for scattering function estimation has been the application to communication channels. For example, the reference "Some Techniques for the Instantaneous Real-Time Measurement of Multipath and Doppler Spread," Bello, P. A., IEEE Transactions on Communication Technology, Vol. 13, No. 3, September 1956, pages 285-292, concentrates on the communication problem where the signal transmitted is a CW carrier that is modulated with the information. In that reference, the carrier is used as the primary signal for evaluating the channel spreading. The results of that work do not apply to applications such as active sonars employing frequency hopped waveforms which do not employ a carrier signal which may be exploited to measure the channel scattering function.

Other prior work is described in "Scattering Function Estimation," Gaardner, N. T., IEEE Transactions on Information Theory, Vol IT-14, No. 5, September 1968. In that reference, the channel is treated as a random time varying linear filter, which is estimated using a bank of linear filters followed by a square law detector, followed by another linear filter. The estimate is an unconstrained linear operation that requires that the transmitted signal have sufficient energy and sufficient time and frequency spread (larger than the correlation in time and in frequency of the random filter) so that the filter can resolve all the correlated filter variations in both time and frequency. The results only provide the properties of the filters in the cascade rather than solutions for the filter transfer functions in terms of the ambiguity function of the input.

An object of the invention is to provide a channel adaptive sonar wherein the channel scattering function is measured and a waveform is selected which has an ambiguity function which minimally overlaps the measured scattering function.

SUMMARY OF THE INVENTION

A presently preferred form of the invention is as a channel-adaptive sonar system, which comprises a sonar transmitter for transmitting sonar excitation signals, such as a frequency-hopped waveform. The excitation signal over some coherent processing interval is characterized by a particular ambiguity function.

The system further comprises a sonar receiver means for receiving the return from the excitation signal and processing the return signals to provide target indication signals.

The system includes a probe signal generator for generating channel probe signals designed to excite the channel for purposes of estimation of the channel scattering properties. In general, these probe signals are in the form of a broadband burst signal or impulse to estimate the multipath spread characteristics of the channel and a narrowband signal in the form of a long duration tonal signal to estimate the Doppler spreading characteristics of the channel.

The sonar further includes a means responsive to the return signals from the transmitted probe signals for estimating the channel scattering function, and a means responsive to the estimated channel scattering function for selecting an active sonar waveform signal having an ambiguity function minimally overlapping with the estimated channel scattering function so that the receiver detection response to channel reverberation noise is decreased.

A system controller provides a means for controlling the probe signal generator, the transmitter, the channel scattering function estimator and the receiver so that the system is operable in a channel measurement mode and a normal active mode. In the channel measurement mode, the probe signal generator is activated to provide the probe signals to the transmitter. The channel scattering function estimator provides an estimate of the channel scattering function in response to the received sonar return from the transmitted probe signals. In the normal active mode, the controller activates the waveform selector to select an appropriate transmit waveform whose ambiguity function minimally overlaps the estimated channel scattering function, thereby reducing the received response due to reverberation noise and enhancing target detection.

BRIEF DESCRIPTION OF THE DRAWINGS

The above recited and other features and advantages of the present invention will become more apparent from the following detailed description of an exemplary embodiment thereof, as illustrated in the accompanying drawings, in which:

FIG. 5 is a graph illustrating a simplified scattering function model useful for waveform design in accordance with the invention.

FIG. 6 is a diagrammatic view of the matched filter of a sonar receiver with a reconstructed time profile of the outputs of the matched filter bins.

FIG. 9 is a contour plot illustrative of the pattern search waveform design technique on an exemplary waveform design problem.

FIG. 12 is a flow chart illustrative of the basic steps of the pattern search waveform design algorithm.

DETAILED DESCRIPTION OF THE DISCLOSURE

Figure 1:
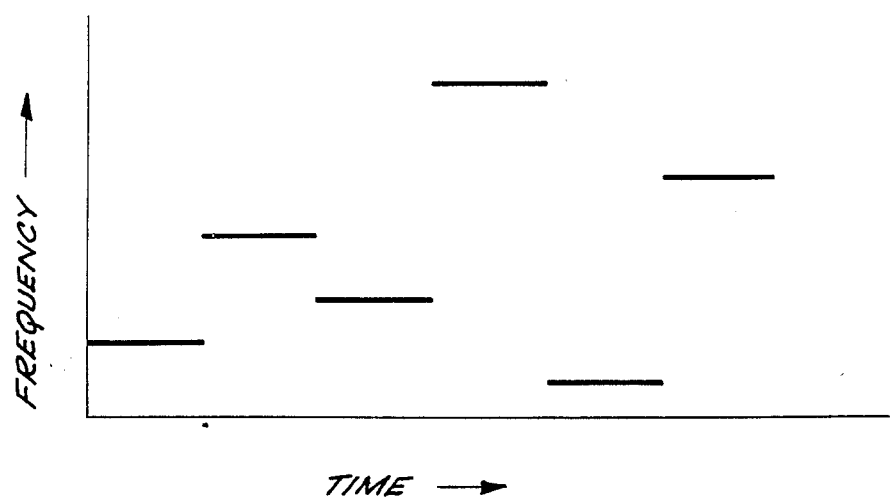
FIG. 1 is an exemplary plot of a frequency-hopped waveform which is transmitted by an active system such as an active sonar.

An exemplary application for the present invention is active sonar systems. Frequency-hopped waveforms are commonly used in active sonars to spread the transmit signal spectrum, wherein each chip may be of a predetermined duration at a predetermined frequency. As a function of time, the transmitted waveform takes the form as generally illustrated in FIG. 1, wherein the frequency of the waveform "hops" from one chip to the next. As is well known, the received returns from the transmitted waveform are processed by the sonar receiver using a bank of matched filter envelope detectors to detect targets.

Equation 1 sets forth the detection index d for a target at a particular range and moving at a particular speed, characterized by propagation delay $\tau_d$ and Doppler frequency $\omega_d$.

$$d = (E_r/N_o)/(1+(E_t/N_o)\int\int S(\omega,-\tau)A(\tau-\tau_d,\omega-\omega_d)d\tau d\omega/2\pi) \qquad (1)$$

where
 $E_t$ = transmit energy
 $E_r$ = received energy
 $N_o$ = noise spectral level
 $S(\omega,\tau)$ = channel scattering function
 $A(\tau-\tau_d,\omega-\omega_d)$ = signal ambiguity function.

The detection performance improves as d is made larger. From Eq. 1 it may be seen that target detection is a function not only of the particular waveform, but also of the scattering properties of the channel.

A conventional sonar receiver typically coherently processes the return resulting from a transmitted waveform over the time interval over which the channel will support coherent processing. The ambiguity function of a frequency-hopped waveform over the coherent processing interval varies with the frequencies of the chips. Thus, changing the frequencies of the chips comprising the waveform will also change the ambiguity function of the waveform over the coherent processing interval.

The return from sonar signal will be a replica of the transmitted waveform, delayed and spread in time by the propagation delay through the channel and shifted and spread in frequency by the Doppler frequency shift caused by the relative motion between the sonar platform and the target or other sonar energy reflectors. The time dispersion is commonly referred to multipath spreading, and the frequency dispersion is commonly referred to as Doppler spreading.

The sonar receiver typically employs a bank of matched detection filters, with the response of each filter tuned to a particular reference waveform, here the transmitted waveform, which is spread in time and frequency to account for a respective predetermined target range and relative motion. In an environment limited only by white noise, the outputs from each of the filters is compared, and the filter with the largest output signal indicates the range and Doppler frequency (or speed) of the target. However, in active sonar, the ocean environment is sometimes limited by reverberation noise, which may be simplistically viewed as noncoherent noise from a multitude of discrete distributed point radiators. The effects of reverberation noise cannot be reduced simply by increasing the transmitted waveform power, since the reverberation noise will also increase proportionately.

The reverberation power $P_R$ at the output of the receiver matched filters is determined as the convolution of the channel scattering function with the waveform ambiguity function, $$P_R = \int\int S(\omega,\tau) A(\omega - \omega_d, \tau - \tau_d) d\omega d\tau \qquad (2)$$

From Eq. 2 it is apparent that by minimizing the overlap in frequency and time between transmitted signal ambiguity function and the channel scattering function, the received reverberation power $P_R$ at the output of the sonar receiver detection filters will also be minimized.

Because the scattering properties of the ocean (the sonar channel) vary widely as a function of such parameters as water depth and temperature, the scattering function is not known in advance for a sonar on a moving platform. In the past, the frequency-hopped waveform for active sonars have been designed in advance, based on assumed channel scattering functions.

Figure 3:
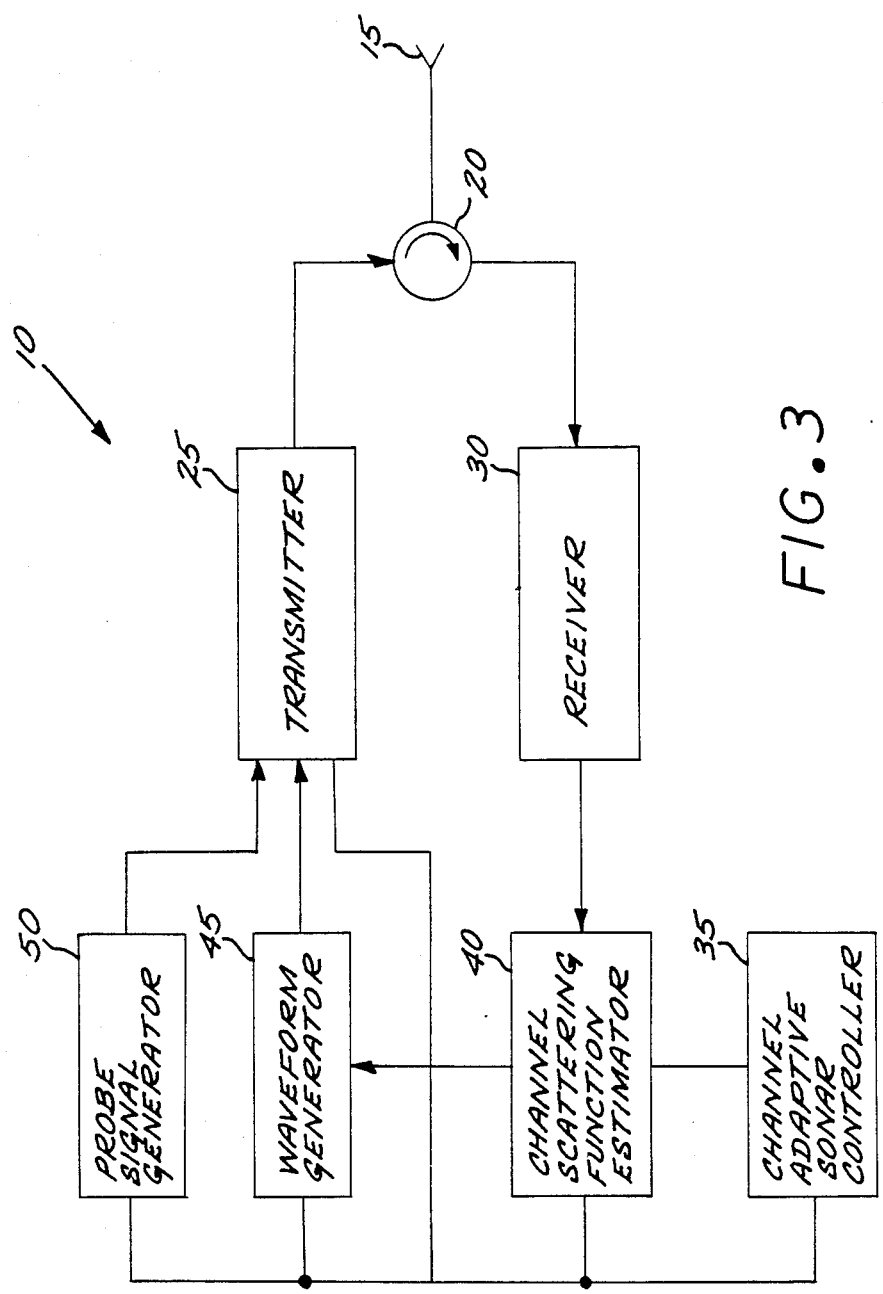
FIG. 3 is a block diagram of a channel adaptive sonar embodying the invention.

In accordance with the invention, a channel-adaptive sonar is provided, wherein the channel scattering function is measured during a channel measurement mode, and the sonar transmit waveform is then selected to minimize the overlap between the channel scattering function and the ambiguity function of the signal. FIG. 3 sets forth a block diagram of a sonar system 10 embodying the invention. The system 10 comprises a transducer 15, such as a hydrophone, for converting between acoustic energy and electrical signals. The system 10 further comprises a receive channel and a transmit channel, coupled to transducer 15 by duplexer 20. The transmit channel comprises transmitter 25, probe signal generator 50 and waveform generator 45. The receive channel comprises receiver 30 and channel scattering function estimator 40.

The system 10 further comprises a channel adaptive sonar controller 35 which controls the operation of estimator 40, waveform generator 45, probe signal generator 50 and transmitter 25 such that the system 10 is operable in a first or a second operational mode. The first mode is the channel measurement mode wherein the channel scattering function is measured and the active waveform is determined, and the second mode is the normal active sonar mode.

In the channel measurement mode, the controller 35 activates the probe signal generator 50 to provide a probe signal to transmitter 25, which amplifies the probe signal. The amplified probe signal is coupled through duplexer 20 to drive the transducer 15. The probe signals are transmitted to estimate the extents of the scattering function. Exemplary probe signals suitable for the purpose are described in the paper "Some Techniques for the Instantaneous Real-Time Measurement of Multipath and Doppler Spread," by P. A. Bello, IEEE Transactions on Communications Technology, Vol. 13, No. 3, 1965, at pages 285-292, the contents of which are incorporated herein by this reference. In general, the probe signals are in the form of a broadband burst signal or impulse to estimate the multipath spread characteristics of the channel and a narrowband signal, i.e., a long duration tonal signal, to estimate the Doppler spreading characteristics of the channel.

The return from the probe signals is converted into corresponding electrical signals at transducer 15, which electrical signals are provided to receiver 30. The channel scattering function estimator 40 employs the estimated multipath spread and Doppler spreading characteristics of the channel to estimate the channel scattering function. The resulting scattering function is then used to drive the waveform selection algorithm carried out by controller 35, by providing the region over which the ambiguity function of the frequency-hopped transmitter signal sequence should overlap minimally.

The sonar controller 35 determines the appropriate frequency-hopped transmit sequence in dependence on the estimated channel scattering function in one of two presently contemplated techniques. In a first technique, a plurality of discrete sets of frequency-hopped sequences are stored in a controller memory, each set corresponding to a particular scattering function. That is, each stored set is characterized by an ambiguity function which overlaps minimally with a predetermined channel scattering function. Thus, a plurality of possible channel scattering functions are considered, and a plurality of corresponding sets of transmit signals are designed such that the respective ambiguity functions overlap minimally with corresponding ones of the channel scattering functions. Hence, once the particular scattering function of the channel is estimated, that function may be employed to select from among the predetermined sets of transmit sequences and provide that stored transmit sequence whose ambiguity function overlaps minimally with the scattering function. This may be done by comparing the particular stored ambiguity function corresponding to the respective stored sets of sequences with the estimated scattering function to determine the particular ambiguity function having the least overlap with the estimated scattering function. The waveform characterized by the determined ambiguity function is the selected waveform.

The second technique for selecting an appropriate transmit waveform is to design the waveform when the channel scattering function is estimated. In either case, the waveform design is advantageously carried out using a pattern search technique. With the pattern search technique, small variations are made in the waveform control parameters (in this case, the locations of the frequency hops in the waveform) and the changes in the performance measure (in this case, the overlap between the resulting ambiguity function and the estimated channel scattering function) are calculated. The variations lead to a direction in which to change the frequencies, and then larger moves or steps are made in that direction as long as they improve the performance measure. If the steps no longer improve the performance measure, then small explorations are resumed about the last point at which an improvement had been found. The pattern search technique has been found to converge for a wide range of problems, to be relatively insensitive to numerical inaccuracies, to be very flexible with respect to the performance criteria for the parameters being varied, and to be well suited to efficient computer implementations in array processors. The pattern search technique is described in further detail below.

In a preferred implementation of system 10, the functions of generators 45 and 50 will be carried out by a programmable frequency synthesizer, and the functions of receiver 30, estimator 40 and controller 35 will be carried out by a digital computer performing digital signal processing on digitized return signals. Other implementations may, of course, be employed within the scope of the invention.

Figure 4:
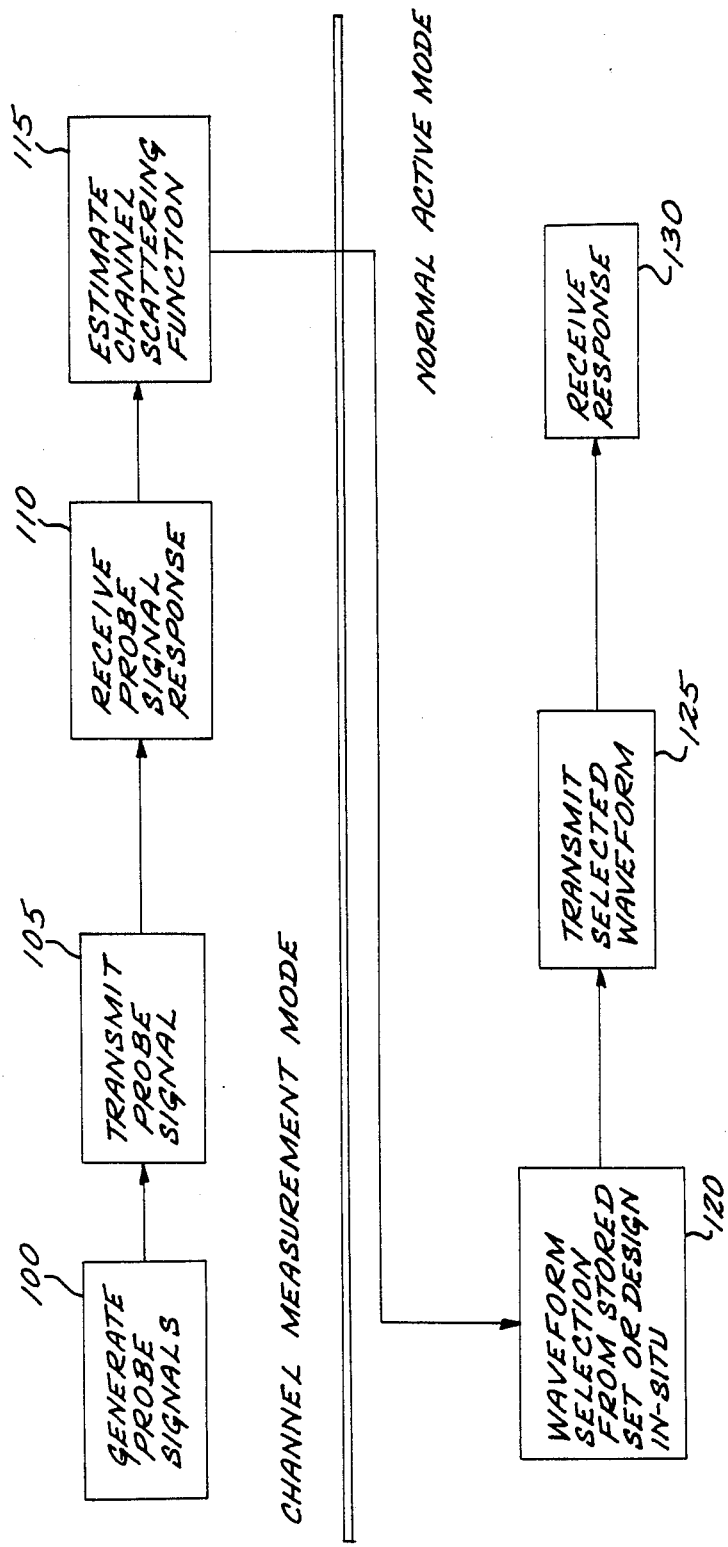
FIG. 4 is a flow diagram of the operation of a channel adaptive sonar employing the invention.

FIG. 4 is a processing flow diagram illustrating the steps performed by the sonar system of FIG. 3 in the channel measurement mode and the normal active mode. The channel measurement mode is shown by steps 100, 105, 110 and 115. At step 100, the probe signals are generated by generator 50. The probe signals are transmitted by transmitter 105 at step 105. The probe signals propagate through the channel, and the return response from the probe signal is received by the receiver 30 at step 110. The return response signals are employed by estimator 40 to estimate the channel scattering function at step 115. At this point, the channel measurement mode is concluded.

The normal active mode of the sonar system is illustrated by FIG. 4 by steps 120, 125 and 130. At step 120, an appropriate waveform is selected in dependence on the estimated ambiguity function, either from a stored set of waveforms or by in-situ design using the pattern search technique described above. The selected waveform is then transmitted at step 125, and the resultant response is received and processed by receiver 30 at step 130.

Figure 2:
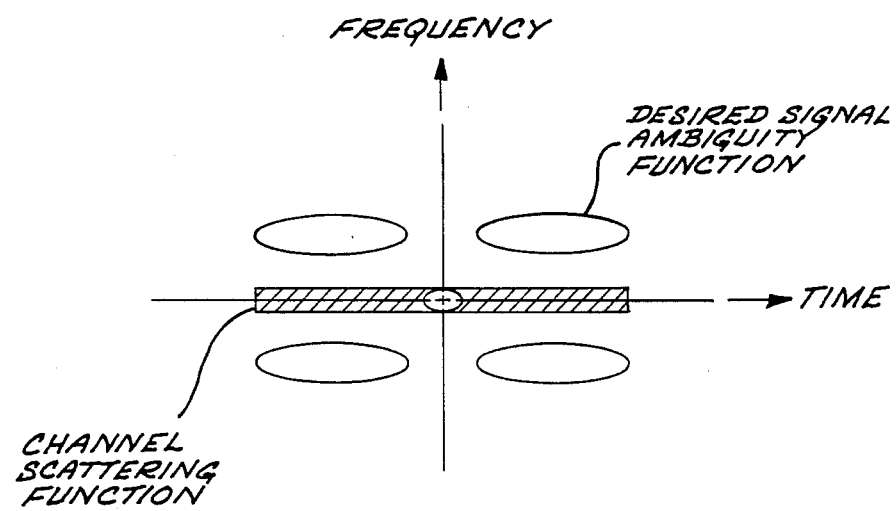
FIG. 2 is a plot of frequency versus time illustrative of a typical channel scattering function and a typical desired signal ambiguity function.

With regard to the function carried out by estimator 40 (FIG. 3), in many applications it is unnecessary to completely specify the channel scattering function; providing estimates only of the extent of the frequency and time spread is sufficient for most applications. Estimating the frequency and time spread extents sets the dimensions of a rectangular approximation to the scattering function, as shown in FIG. 2 and in FIG. 5. Although such a scattering function never occurs in reality, any waveform that has small overlap with this rectangular area also has small overlap (and good reverberation immunity) with any actual scattering function. In fact, the approximation could even be carried further, to the assumption that the time extent is infinite, so that the estimation becomes one dimensional, i.e., estimating the frequency extent.

The scattering function extent can be computer directly from the matched filter outputs that are normally computed in the active sonar receiver. In most sonar applications, the range and Doppler frequency of the target are unknown. Matched filters are then constructed between the minimum and maximum range and Doppler frequency expected for the targets of interest. Because of implementation considerations, the matched filter outputs are not computed continuously in time (range) and frequency (Doppler), but are computer at discrete intervals in time. The discrete matched filter outputs at a particular time are called range bins, while those at a particular frequency are called Doppler bins.

Figure 7:
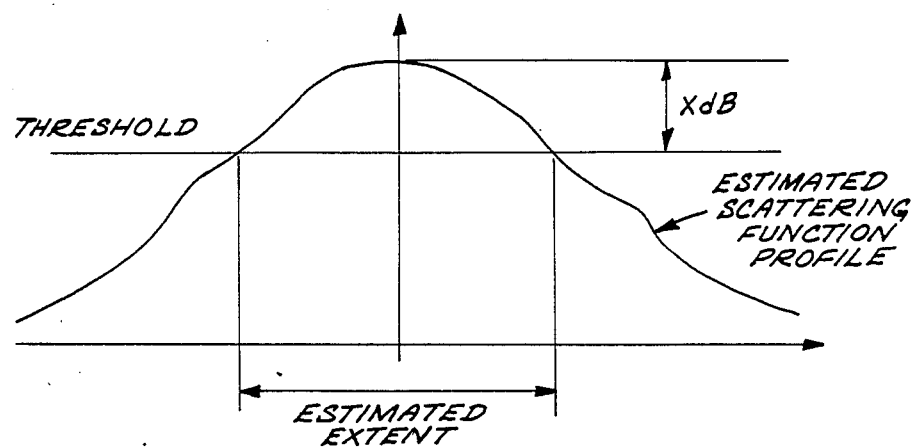
FIG. 7 is a plot of the reconstructed time profile as in FIG. 6 with a predetermined threshold value, illustrating the determination of the scattering function time extent.

The determination of the time extent of the scattering function utilizes a probe singal whose duration is small in comparison to the time extent of the scattering function being measured. The extent of this time function is the result of the convolution of the reverberation of the scattering function and the probe waveform ambiguity function. Consequently, the extent of the reconstructed time profile is nominally the sum of the waveform ambiguity function time extent and the scattering function time extent. The time sequence of matched filter outputs (corresponding to the discrete range bins) in the zero Doppler bin (after the Doppler of the sonar platform has been removed) is used to reconstruct a continuous time profile of the matched filter output, as shown in FIG. 6. The extent of the reconstructed time profile is measured as shown in FIG. 7 as the time interval over which the profile remains above a threshold set X dB below the profile maximum value. Because the probe signal is relatively short in duration, it causes minimal distortion of the reverberation scattering function in the matched filter receiver output. Hence, the scattering function time extent is estimated as the measured extent of the profile minus the probe signal ambiguity function time extent (which is known in advance).

Figure 8:
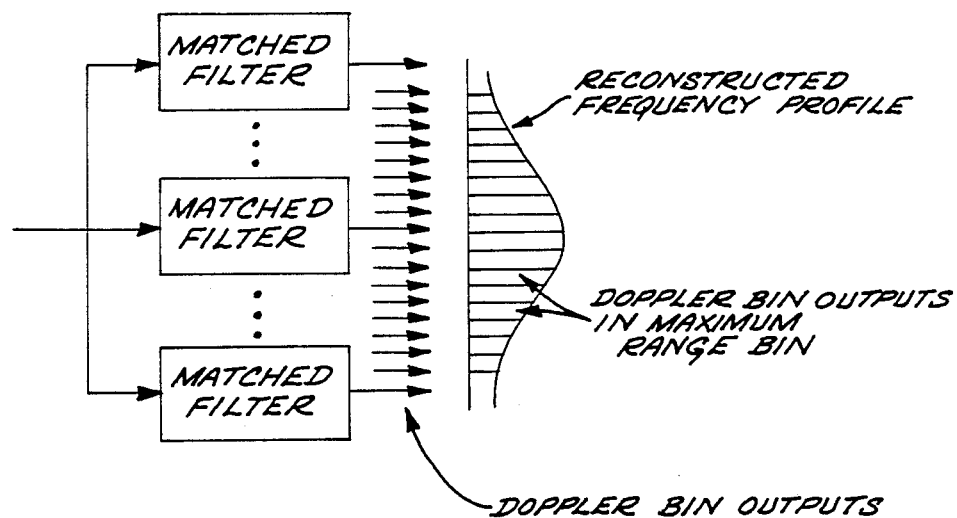
FIG. 8 is a diagrammatic view of the matched filter bins of a sonar receiver, with a reconstructed frequency profile of the Doppler bin outputs.

For the purposes of determining the Doppler frequency extent of the reverberation scattering function, a very long CW probe signal is used. The length of the pulse, T, is selected to be sufficiently long that $1/T$ is small in comparison to the frequency extent of the scattering function. This assures that the scattering function will not be significantly distorted in the matched filter outputs. To estimate the frequency extent of the scattering function, a continuous frequency profile is reconstructed from the sequence of Doppler bins at the time (range) corresponding to the largest reverberation output, as shown in FIG. 8. The measured value of the frequency extent is extracted using the same thresholding technique applied to the determination of the time extent. The frequency extent used to set the frequency dimension of the rectangle in FIG. 5 is just the frequency extent of the profile minus the frequency extent of the probe signal ambiguity function.

Direct search techniques are described in the "Direct Search Solution of Numerical and Statistical Problems," Hooke, R. and Jeeves, T. A., *Journal of ACM*, Vol. 8, No. 2, 1961, pages 212–229. This reference provides a mathematical technique ("direct search") for searching any computable measure of performance versus its key functional parameters to provide an optimal solution. The direct search technique has been modified and adapted to the active sonar application to select sonar waveforms with minimal response to the reverberation, while still preserving the response to the low Doppler signal return. The sonar waveform selection technique is referred to herein as the pattern search technique.

In the pattern search technique employed in connection with the waveform selection carried out by controller 35 (FIG. 3), the first step is to select a suitable norm or criterion to be optimized. Here, the waveform is assumed to be a frequency-hopped waveform which consists of a contiguous series of, say, M continuous wave (CW) pulses, each with a frequency $f_m(m=1,2,\ldots,M)$. The goal of the optimization procedure is to choose the frequency hops that maximize the detection index d (Eq. 1) by minimizing the overlap between the waveform ambiguity function and the reverberation scattering function, as discussed above. Perhaps the obvious way to determine the frequency hops is to exhaustively compute this overlap for all frequency combinations and then choose the best waveform. This is impractical for waveforms with even a modest number of chips if the quantization of frequencies is relatively fine because of the large number of combinations. The pattern search technique provides a systematic way of varying the frequencies to find those that minimize the overlap without computing the overlap for all weight combinations. The technique makes small variations in the frequencies, computes the resulting ambiguity function, then determines the resulting change in the overlap between the ambiguity function and the assumed scattering function. This result is used to determine a direction in which to vary the frequencies by a larger amount. If the overlap decreases, then continued steps in that direction are taken as long as the reduction continues. An acceleration is built into the algorithm by increasing the step size as long as the situation is improving.

FIG. 9 shows a more detailed illustration of this pattern search technique on a hypothetical surface for a simple waveform with only two chips. The figure plots contours of the overlap between the scattering function and the ambiguity function that results for the values of the frequency hops at which the point is plotted. The starting point (shown as base point "B1") is at the contour of height −5 dB. At that point small incremental variations are made by changing each chip frequency independently by plus and then by minus a pre-selected constant. As soon as one of these increments reduces the norm (the overlap in this example), that direction is saved and the next frequency is incrementally varied. Once all the frequencies have been so varied, an "explore move" is made in the direction indicated by the saved directions from all the incremental moves and in an amount resulting from the incremented variation in the chip frequency. A new base point B2 is established at the end of each explore move. Thus, for example, the explore move from base point B1 to new base point B1 is the resultant vector from increases in the chip 1 and chip 2 frequencies by the pre-selected constant by which the incremental variations about point B1 were made. Thus, the resultant vector is at a 45° angle from the axis and point B1 on the surface represented by FIG. 9. From the new base point, for example, point B2, a "pattern move" is made. The pattern move is made along the direction of the line connecting the previous two base points; for example, pattern move P1 is made along the direction of the line connecting base points B1 and B2. The end of each pattern move such as move P1 establishes a "trial base point" from which incremental variations are again made. If these produce a further improvement, then an explore move is made in the direction indicated by the incremental variations, and a new base point B3 is established.

Each time a pattern move is successful (i.e., the subsequent incremental moves produce a reduction in the overlap), the step size for the next pattern move is increased, causing convergence to accelerate as long as the direction of movement is successful. This produces the new trial point T3 and its successful base point B4. If the incremental search at the trial base point following the pattern move is unsuccessful (i.e., produces no reduction in the overlap between the ambiguity function and the scattering function), then the pattern move step size is rest to its initial value, and the algorithm returns to the last base point, starting again with incremental variations. This is the case at trial base point T4 after the pattern move P3 in the direction connecting base points B3 and B4. After the unsuccessful pattern move, the search then returns to base point B4 and performs incremental variations there to establish base point B5. The pattern move at base point B5 is then in the direction of the line connecting base points B4 and B5. The trial point T5 succeeds in establishing base point B6, and the search continues.

The search process will eventually lead to a point where the incremental variations always increase the overlap. The step size is then reduced by a factor and the search is attempted again until the step size falls below some threshold size. At that point a minimum solution has been obtained.

Each set of chip frequencies may be viewed as waveform vector, with the various chip frequencies comprising components of the waveform vector. For clarity, FIG. 9 illustrates a simple waveform comprising only two chips. It will be understood that the number of chips, say, M chips, comprising the waveform is a design variable so that the waveform vector is in general a vector in some M-dimensional space.

The solution may be only a local rather than a global minimum. To test for this, the frequencies can be perturbed from the final value to see if they return to the same values, or the algorithm can be re-run with different initial conditions. It should be noted that the ability of the algorithm to find multiple local minima in the overlap can be useful if a number of the minima yield satisfactory reduction in reverberation. Work with this technique to date indicates that multiple minima with good reverberation rejection generally do exist. The set of frequency hops corresponding to these minima provides a class of waveforms with similar reverberation rejection properties, but different frequency-time patterns. This can allow operation in a given environment with several different waveforms that are well-matched to the reverberation simultaneously.

The computation time in the evaluation of the overlap is greatly reduced by assuming the simple rectangular model for the scattering function shown in FIG. 5. Reducing the overlap between the ambiguity function and this simplied scattering function clearly reduces the overlap with any actual scattering function that has most of its mass inside the rectangular region. With this simplification, the algorithm calculates the waveform ambiguity function for each frequency variation at a grid of points in the range-Doppler plane within the assumed rectangular region. The overlap is just the integral of the ambiguity function in the rectangular area, so by placing the grid densely enough, the sum of the samples of the ambiguity function at the grid points is a good approximation to the overlap.

Figure 10A:
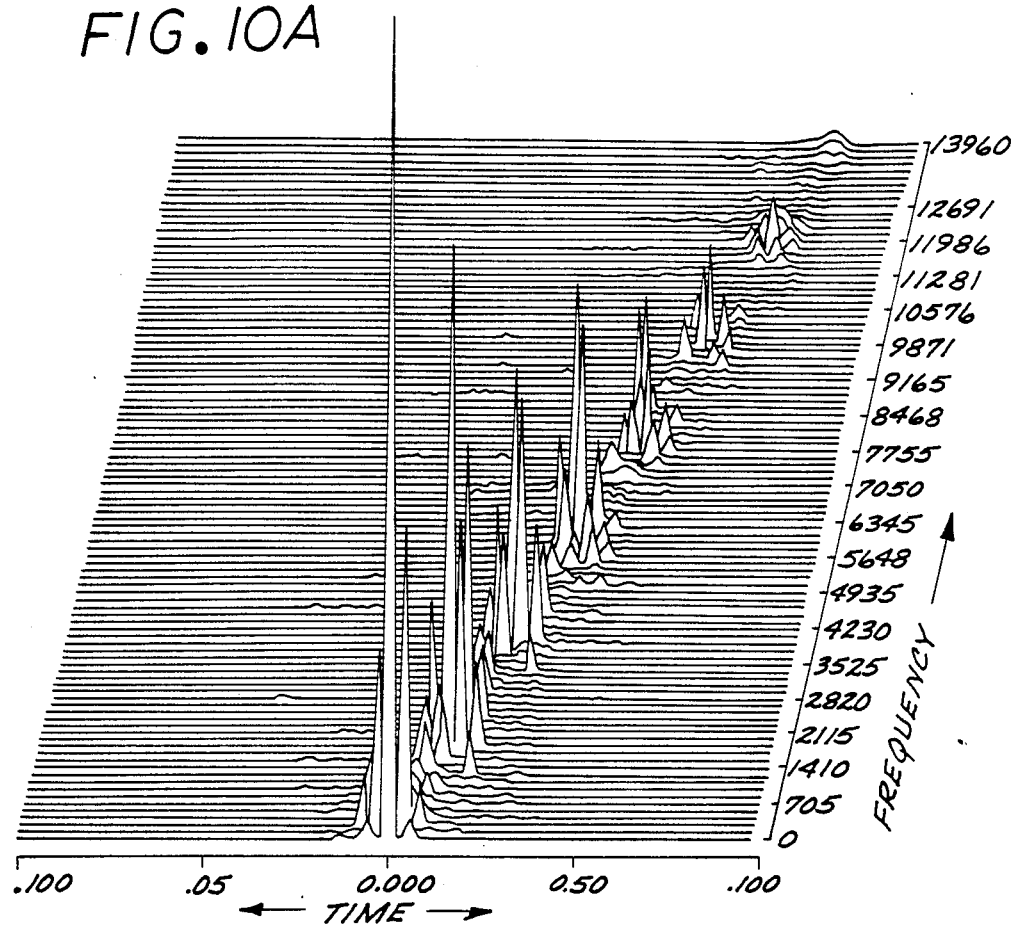
FIG. 10A is a plot of the ambiguity function of the exemplary linear FM waveform shown in FIG. 10B before optimization in accordance with the disclosed pattern search technique.
Figure 10B:
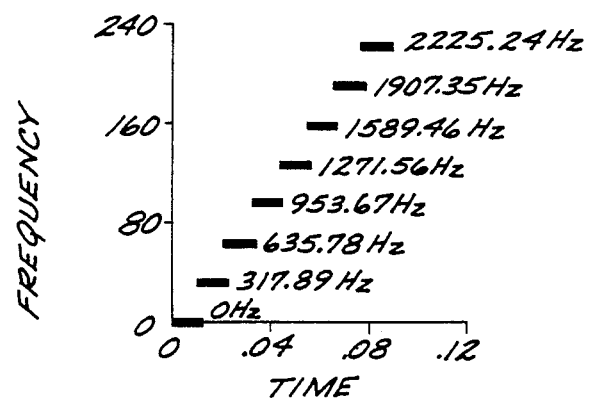
Figure 11A:
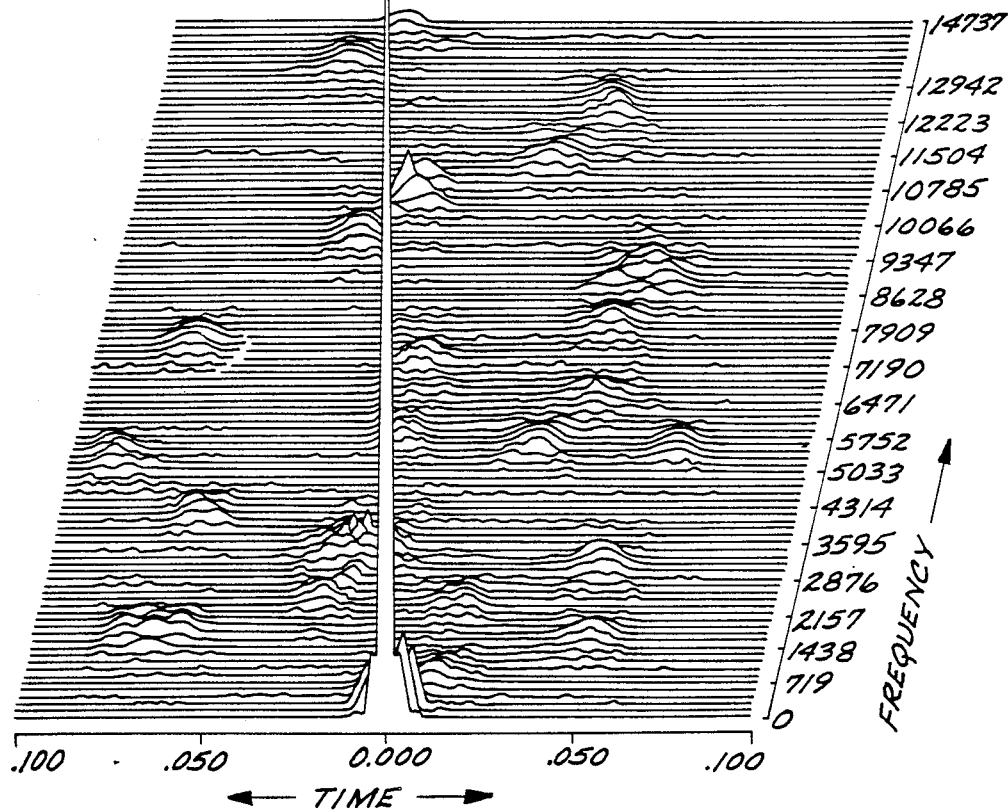
FIG. 11A is a plot of the ambiguity function as in FIG. 10A, but wherein the waveform has been optimized by the pattern search technique to the waveform shown in FIG. 11B to minimize overlap with an indicated reverberation region.
Figure 11B:
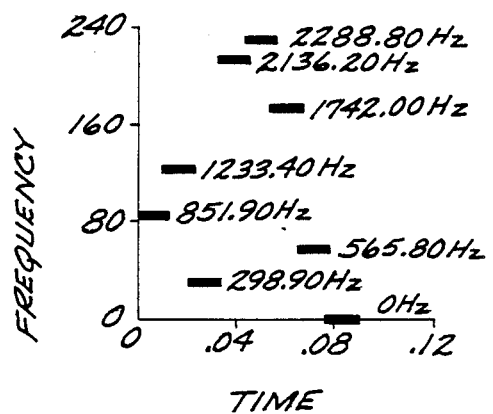

FIGS. 10A–10B and FIGS. 11A–11B illustrate the effectiveness of this design procedure using the rectangular scattering function approximation. The scattering function is assumed to be a narrow strip ±2 Hz wide with infinite extent along the time axis. This model applies whenever the range spread of the reverberation is longer than twice the waveform duration The waveform prior to optimization is the eight chip Linear Stepped FM signal shown in FIG. 10B with the ambiguity function shown in FIG. 10A. FIG. 10A shows the ambiguity function on one half of the range-Doppler plane (the ambiguity function has rotational symmetry around the origin). FIG. 11B shows the same plot for the eight chip frequency hopped waveform resulting from optimization, as shown in FIG. 11B. The volume of the ambiguity function in the strip has been reduced, increasing the detection index. The reduction in volume in the strip, excluding the ambiguity function main lobe (which cannot be reduced), is about 8 dB.

A simplified flow chart of the pattern search algorithm is shown in FIG. 12. The current best estimate of the solution resides in a base point or vector which describes the frequencies of the waveform chips, initially set to some estimate at step 205. The algorithm permits two kinds of "moves" or shifts in the chip frequencies. In one move, the exploratory move (step 210), the components of the base point or vector, i.e., each chip frequency, are each perturbed by a fixed step and the resulting performance evaluated, here, the overlap between the calculated ambiguity function of the resulting waveform and the estimated channel scattering function. After all dimensions are examined, the exploratory move (step 210) is considered a success if there is improvement in the estimate and a failure if there is no improvement (step 210).

The second kind of move is the a pattern move (step 225), which is where most of the gains in the estimate are made. A pattern move generates a new base point or vector, $$W_{new} = W_{old} + \rho(W_{current} - W_{old}),$$

where $\rho$ is a convergence acceleration factor and the W's are base vectors.

Every pattern move (step 225) is followed by an exploratory move and an evaluation (step 230). Most computation is consumed in performance evaluation and exploration. Failure of a pattern move results in returning to the first level exploration (step 210), resetting the telescoping effect that occurs in the pattern move loop (steps 220, 225 and 230). Failure at the first level exploration results in reduced exploratory move step size (step 215). Convergence (step 235) is determined by step size, i.e., when it is reduced below a significant level $\epsilon$.

While the invention has been described in the context of sonar systems, the principles of the invention may be applied in other applications. One such application is radar systems, wherein the invention is employed to reduce the radar system response to clutter noise.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A channel-adaptive active system using the return signals from transmitted signals to detect targets, said system comprising means activated during a system channel measurement operating mode for actively measuring the scattering function of the particular channel over which the system is presently operating, and means activated during a normal system active mode and responsive to the scattering function measured during said channel measurement mode for selecting a particular transmit signal waveform whose ambiguity function overlaps minimally with the measured channel scattering function to reduce the system response to noise.

2. The active system of claim 1 wherein said means for actively measuring the channel scattering function comprises means for transmitting channel probe signals and means responsive to the return signals from said probe signals for estimating the time and frequency extent of said scattering function.

3. The active system of claim 1 wherein said means for selecting said transmit signal waveform comprises a memory means for storing data representing a plurality of waveforms each designed in advance so that its corresponding ambiguity function has minimal overlap with some particular scattering function, and means for comparing said measured scattering function with the corresponding ambiguity function of each stored waveform to select that waveform whose ambiguity function overlaps minimally with the measured channel scattering function.

4. The active sonar system of claim 1 wherein said transmitted signals comprise signals having frequency-hopped waveforms comprising a sequence of contiguous single frequency chips, wherein the chip frequency varies from chip to chip.

5. A channel-adaptive active sonar system, comprising:
   a sonar transmitter for transmitting a selected one of a plurality of different sonar exitation signals, each of said signals being characterized by a corresponding ambiguity function;
   a sonar receiver for receiving sonar return signals and processing said signals to provide target indication signals;
   means coupled to said transmitter for generating probe signals;
   means responsive to the sonar return from said transmitted probe signals for estimating the scattering function of the particular sonar channel over which the sonar system is operating; and
   means for selecting said sonar execitation signals in dependence on said estimated scattering function of the sonar channel to minimize the overlap between the ambiguity function of the selected exitation signals and said scattering function of said channel and thereby reduce the response of the sonar receiver to reverberation noise.

6. The sonar system of claim 5 wherein said excitation signals comprise signals having frequency-hopped waveforms comprising a sequence of contiguous single frequency chips, wherein the chip frequency varies from chip to chip.

7. The sonar system of claim 6 wherein said scattering function is at least partially characterized by its time extent, said probe signal comprises a waveform whose duration is short in comparison to the time extent of the channel scattering function being estimated, and said means for estimating the channel scattering function comprises means responsive to the sonar return signal from said short duration probe signal for estimating the time extent of the scattering function.

8. The sonar system of claim 6 wherein said scattering function is at least partially characterized by its frequency extent, said probe signal comprises a continuous wave (CW) probe signal of duration T sufficiently long that 1/T is small in comparison to the frequency extent of the scattering function being measured, and wherein said means for estimating the scattering function comprises means responsive to the return from said CW probe signal for estimating the frequency extent of said channel scattering function.

9. The sonar system of claim 5 wherein said means for selecting said excitation signals comprises memory means for storing a plurality of waveforms each designed so that its corresponding ambiguity function has minimal overlap with some predetermined estimated scattering function, and means for comparing said estimated scattering function with said corresponding ambiguity functions to select that stored waveform whose ambiguity function overlaps minimally with the estimated channel scattering function.

10. The sonar system of claim 9 wherein said stored waveforms represent frequency-hopped waveforms each comprising a plurality of contiguous single frequency chips.

11. The sonar system of claim 5 wherein said means for selecting said sonar excitation signals in dependence on said estimated scattering function comprises means for designing a frequency-hopped waveform comprising a plurality of contiguous single frequency chips and characterized by an ambiguity function having very little overlap with said estimated channel scattering function.

12. A method for designing frequency-hopped active sonar waveforms for minimizing the response of the sonar receiver to channel reverberation noise while maintaining receiver response to returns from low Doppler targets, each waveform comprising a plurality of contiguous single frequency chips comprising a sequence of the following
(i) providing an estimate of the sonar channel scattering function;
(ii) providing a set of chip frequencies specifying an initial base waveform vector, calculating the corresponding waveform ambiguity function and determining the extent of overlap of said ambiguity function with said estimated scattering function;
(iii) respectively perturbing each chip frequency by a predetermined step size, computing the ambiguity function of the resulting waveform and the overlap between said ambiguity function and said estimated scattering function, determining whether the overlap decreased as a result of perturbing the frequencies comprising said set and saving the results of the determination for each frequency perturbation;
(iv) if the overlap is decreased for one or more of the perturbed waveforms, changing said set of chip frequencies by a predetermined amount in the direction which resulted in decreasing said overlap to provide a new set of chip frequencies establishing a new base waveform vector; and
(v) repeating said steps (iii) and (iv) to converge on a set of frequency chips characterized by an ambiguity function having minimal overlap with said estimated channel scattering function.

13. A channel-adaptive active sonar system for reducing the system response to reverberation noise, comprising:
a sonar transducer for converting between acoustic and electrical energy;
a sonar transmitter coupled to said transducer for providing sonar excitation signals characterized by a particular ambiguity function;
a sonar receiver for receiving sonar return signals and processing said signals to provide target indication signals;
a probe signal generator coupled to said transmitter for providing predetermined probe signals for transmission over the sonar channel to measure the scattering properties of the sonar channel;
means coupled to said receiver and responsive to the return from said probe signals for estimating the channel scattering properties;
sonar controller means responsive to said estimated channel scattering properties for selecting a transmit signal waveform whose ambiguity function overlaps minimally with the estimated channel scattering properties, thereby reducing the received sonar response to reverberation noise.

14. The active sonar system of claim 13 wherein said channel scattering properties are characterized by a scattering function having a time extent and a frequency extent, and wherein said estimating means comprises means for estimating said time and frequency extents of said channel in response to said return from said probe signals.

15. The active sonar system of claim 13 wherein said probe signals comprise a first probe signal whose duration is short in comparison to the time extent of the scattering function being measured, and said means for estimating said scattering function time extent comprises means responsive to the return from said first probe signal.

16. The active sonar system of claim 13 wherein said probe signals comprise a continuous wave (CW) probe signal of duration T sufficiently long that 1/T is small in comparison to the frequency extent of said scattering function being measured, and wherein said estimating means comprises means response to the return from said CW probe signal for estimating the frequency extent of said channel scattering function.

17. A channel-adaptive active sonar system using the return signals from transmitted sonar signals to detect targets, said system comprising means activated during a system channel measurement operating mode for actively measuring the scattering function of the particular sonar channel over which the system is presently operating, and means activated during a normal system active mode and responsive to the scattering function measured during said channel measurement mode for selecting a particular sonar signal waveform whose ambiguity function overlaps minimally with the measured channel scattering function to reduce the system response to reverberation noise.

18. The active sonar system of claim 17 wherein said means for actively measuring the channel scattering function comprises means for transmitting channel probe signals and means responsive to the sonar return signals from said probe signals for estimating the time and frequency extent of said scattering function.

19. The active sonar system of claim 17 wherein said means for selecting said sonar signal waveform comprises a memory means for storing data representing a plurality of waveforms each designed in advance so that its corresponding ambiguity function has minimal overlap with some particular scattering function, and means for comparing said measured scattering function with the corresponding ambiguity function of each stored waveform to select that waveform whose ambiguity function overlaps minimally with the measured channel scattering function.

20. The active sonar system of claim 17 wherein said transmitted sonar signals comprise signals having frequency-hopped waveforms comprising a sequence of contiguous single frequency chips, wherein the chip frequency varies from chip to chip.

21. The active sonar system of claim 20 wherein said means for selecting a sonar signal waveform comprises:
 (i) means for providing a set of chip frequencies specifying an initial base waveform vector, calculating the corresponding waveform ambiguity function and determining the extent of overlap of said ambiguity function with said estimated scattering function;
 (ii) means for respectively perturbing each chip frequency by a predetermined step size, computing the ambiguity function of the resulting waveform and the overlap between said ambiguity function and said measured scattering function, determining whether the overlap decreased as a result of perturbing the frequencies comprising said set and saving the results of the determination for each frequency perturbation;
 (iii) means responsive to said determination that said overlap decreased as a result of said perturbation for changing said set of chip frequencies by a predetermined amount in the direction which resulted in decreasing said overlap to provide a new set of chip frequencies establishing a new base waveform vector, thereby converging on a set of frequency chips characterized by an ambiguity function having minimal overlap with said measured channel scattering function.

22. A method for designing frequency-hopped active sonar waveforms for minimizing the response of a sonar receiver to channel reverberation noise while maintaining receiver response to returns from low Doppler targets, each waveform comprising a sequence of contiguous single frequency chips, comprising a sequence of the following steps:
 (i) providing an estimate of the sonar channel scattering function;
 (ii) providing an initial waveform base vector whose components are the frequencies of the respective chips, calculating the ambiguity function of said waveform base vector and determining the overlap between the estimated channel scattering function and the ambiguity function;
 (iii) making small incremental variations of a predetermined step size in each of the components of the base vector by changing each frequency independently by plus and then minus a preselected constant, calculating said overlap for each base vector variation and saving each variation direction which results in reduction of said overlap relative to the said overlap determined for said base vector;
 (iv) if none of the variations in the components of said base vector resulted in reduction of said overlap relative to said overlap determined for said base vector, reducing the size of said step size and repeating step (iii) until said step size falls below a predetermined threshold size to declare the resulting waveform vector as an optimized waveform vector;
 (v) if one or more of the variations in said base vector in step (iii) resulted in reduction of said overlap, making an exploratory change in the base vector in the direction indicated by the saved variation directions to a new base vector;
 (vi) making a pattern move change of a predetermined move size in said new base vector in the direction defined by a vector between said initial base vector and said new base vector to establish a trial base vector, making small incremental variations of said predetermined step size in the components of the trial base point, and saving each variation direction which results in reduction of said overlap to determine if the pattern move was successful in reducing said reduction in overlap;
 (vii) if the pattern move of step (vi) was successful, making an exploratory change in said trial base vector in the direction indicated by the successful variations about the trial base point to establish a new base point;
 (viii) if the pattern move was not successful, returning to the last base point vector of step (v) and repeating steps (iii)-(v) relative to said last base point vector.

23. The method of claim 22 wherein the move size of the pattern move change of step (vi) is increased after each successful pattern move to accelerate convergence on an optimized waveform, and wherein said move size is reset to said predetermined move size after each unsuccessful pattern move change.

* * * * *